Nov. 11, 1947.   J. G. ZOLLEIS   2,430,657
COUPLING
Filed May 6, 1943

INVENTOR
JOHN G. ZOLLEIS
BY
ATTORNEY

Patented Nov. 11, 1947

2,430,657

UNITED STATES PATENT OFFICE 2,430,657

COUPLING

John G. Zolleis, Philadelphia, Pa.

Application May 6, 1943, Serial No. 485,806

2 Claims. (Cl. 285—86)

This invention relates to improvements in a coupling for tubes and its object is to provide a simple and inexpensive device which may be easily applied, to form leak-proof connections between two sections of tubes or between an end of a tube and another pipe or fixture. Another object is to provide a coupling which is especially adapted for use with tubes of plastic or other deformable material.

I will describe my invention in the following specification and point out its novel features in the appended claims.

Referring to the drawings.

Figure 1:
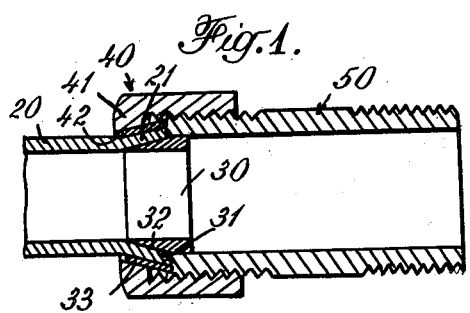
Fig. 1 is a sectional elevation of a coupling which is made according to and embodies my invention.

20 designates a tube of deformable material and 30 in Fig. 1 designates a hollow expander which has a cylindrical portion 31 and a part 32 having a tapered outer surface. This is inserted in the end of the tube which causes its end portion 21 to flare outwardly as shown.

40 is an internally threaded nut on which is an end flange 41 with an opening therein to clear the tube. This opening is beveled, as at 42, on an angle substantially the same as that of the tapered portion 32 of the expander.

50 is an externally threaded coupling member having a cylindrical bore. The nut 40 is screwed onto one of the ends of the coupling member. The cylindrical part 31 of the expander fits slidably in its bore and is guided thereby. This keeps the end of the tube in axial alinement with the coupling member. A tapered annular collar 33 is interposed between the outer surface of the flared end portion 21 of the tube and the beveled opening 42 of the nut. This collar may be of deformable material and extends over the beveled part 32 of the expander substantially to the end of the tube. The end of the tube 20 abuts against the end of the coupling member 50.

When the nut 40 is turned onto the coupling member 50, its flange 41, which engages the outer end of the collar, is advanced longitudinally. This tends to move the tube and forces the end thereof into tight sealing engagement with the end of the nipple. At the same time the flared end portion 21 of the tube is squeezed between the tapered portion of the expander and the collar 33. This forms a connection which is capable of resisting tensional strain. The collar separates the flange of the nut from the tube and thus protects the tube from being injured by the rotation of the nut. It also prevents the end of the tube from spreading outwardly.

Figure 2:
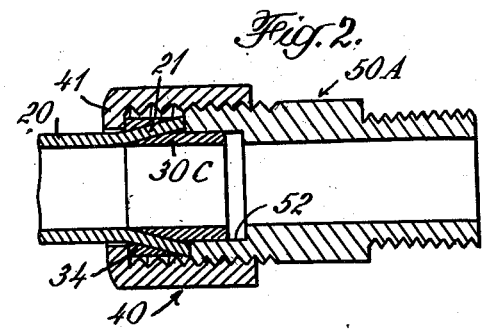
Fig. 2 is a similar view of a modified structure which also embodies the invention.

The expander 30C in Fig. 2 is like that shown in Fig. 1, except its cylindrical portion is longer and its inner bore is of the same diameter as that of a coupling member, 50A. In this case the cylindrical part of the expander fits slidably in a counterbore 52 in the coupling member 50A and is centered and guided thereby. The collar 34 has a tapered bore, which extends over the flared end portion 21 of the tube and across the beveled part of the expander to the end of the tube. Its outer surface is cylindrical and its outer end is normal to its axis. The inner surface of the flange of the nut is in this case normal to its axis. The outer end of the collar is of sufficient thickness to prevent the flange of the nut from contacting the tube 20.

Screwing the nut 40 onto the coupling member 50A moves the collar 34 inwardly and forces the end of the tube into tight sealing engagement with the part of the end of the coupling member 50A surrounding the counterbore 52. As in the construction shown in Fig. 1, the flared end portion 21 of the tube is squeezed by this operation between the beveled part of the expander and the collar 34 to form a connection which is capable of resisting tensional strains.

The drawings show a coupling member with a tube affixed to one of its ends. Obviously, the same arrangements may be provided on the other end of the coupling member for the purposes of interconnecting two tubes.

This invention is capable obviously of many modifications, some of which are illustrated and described herein, and I intend no limitations other than those imposed by the appended claims.

What I claim is:

1. The combination with a tube of deformable material, an externally threaded coupling member having a cylindrical bore and a transverse abutment surface, a nut in adjustable threaded engagement with said member, said nut having an end flange with a clearance opening therein for the tube, a hollow rigid expander having a portion within the tube with an external conical surface and a cylindrical portion extending beyond the end of the tube into slidable engagement with the bore in the coupling member, and an annular collar engaging said flange and having an inner conical surface, said collar extending over the conical surface of the expander substantially to the end of the tube, the conical surface of the collar engaging the tube and arranged by relative rotation between the nut and the coupling member to force the end of the tube into tight sealing engagement with the abutment surface of the coupling member.

2. The combination with a tube of deformable material, an externally threaded coupling member having a cylindrical bore and a transverse abutment surface, a nut in adjustable threaded engagement with said member, said nut having an end flange with a clearance opening therein for the tube and an internal conical surface, a hollow rigid expander having a portion within the tube with an external conical surface and a cylindrical portion extending beyond the end of the tube into slidable engagement with the bore in the coupling member and an annular collar engaging said flange and having inner and outer conical surfaces, said collar being interposed between the tube and the conical surface of the nut and extending over the conical surface of the expander substantially to the end of the tube, the inner conical surface of the collar engaging the tube and arranged by relative rotation between the nut and the coupling member to force the end of the tube into tight sealing engagement with the abutment surface of the coupling member.

JOHN G. ZOLLEIS.

REFERENCES CITED

The following references are of record in the file of this patent:

UNITED STATES PATENTS

| Number | Name | Date |
|---|---|---|
| 2,122,616 | Lamont | July 5, 1938 |
| 2,328,469 | Laffly | Aug. 31, 1943 |
| 1,157,695 | Kast | Oct. 26, 1915 |
| 187,395 | Leland | Feb. 13, 1877 |
| 2,000,481 | Harrison | May 7, 1935 |

FOREIGN PATENTS

| Number | Country | Date |
|---|---|---|
| 266,422 | Great Britain | Feb. 14, 1927 |
| 341,553 | France | Aug. 11, 1904 |
| 437,416 | Great Britain | Oct. 29, 1935 |